US012718171B2

(12) United States Patent
Mizes et al.

(10) Patent No.: US 12,718,171 B2
(45) Date of Patent: Aug. 25, 2026

(54) SYSTEMS AND METHODS FOR QUANTIFYING NETWORK GROWTH USING ARTIFICIAL INTELLIGENCE AND MACHINE LEARNING MODELS

(71) Applicant: Verizon Patent and Licensing Inc., Basking Ridge, NJ (US)

(72) Inventors: Howard Mizes, Salem, SC (US); Kaiss K. Alahmady, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 74 days.

(21) Appl. No.: 18/644,002

(22) Filed: Apr. 23, 2024

(65) Prior Publication Data

US 2025/0328849 A1 Oct. 23, 2025

(51) Int. Cl.
*G06Q 10/00* (2026.01)
*G06Q 10/0637* (2023.01)
*G06Q 30/0202* (2023.01)

(52) U.S. Cl.
CPC ... *G06Q 10/06375* (2013.01); *G06Q 30/0202* (2013.01)

(58) Field of Classification Search
None
See application file for complete search history.

(56) References Cited

U.S. PATENT DOCUMENTS

2003/0130983 A1* 7/2003 Rebane .............. G06Q 30/0601
2007/0185758 A1* 8/2007 Gibson ............ G06Q 10/06375 705/7.37
2015/0213512 A1* 7/2015 Spievak ............. G06Q 30/0275 705/14.71
2020/0043029 A1* 2/2020 Li ...................... G06Q 30/0202
2021/0374803 A1* 12/2021 Tavassoli ........... G06Q 30/0255
2021/0377290 A1* 12/2021 Roosenraad .......... H04L 67/535
2022/0092641 A1* 3/2022 Tavassoli ........... G06Q 30/0255
2022/0164593 A1* 5/2022 Singla ................. G06F 18/2431
2022/0329328 A1* 10/2022 Paulraj ................... H04B 17/17
2022/0405775 A1* 12/2022 Siebel ................ G06Q 30/0202

(Continued)

OTHER PUBLICATIONS

Butakov, Nikita, Machine learning use cases: how to design ML architectures for today's telecom systems, May 26, 2021, Ericsson blog, https://www.ericsson.com/en/blog/2021/5/machine-learning-use-cases-in-telecom, p. 1-7. (Year: 2021).*

*Primary Examiner* — Joseph M Waesco

(57) ABSTRACT

A device may receive data identifying characteristics, location dependent characteristics, and a network service associated with target consumers, such as households or businesses, and may process the data, with one or more propensity models, to determine propensities of the target consumers to utilize the network service. The device may process the data and the propensities, with a state transition model, to calculate probabilities that the target households will utilize the network service, and may determine utilization states of the target consumers over time based on the probabilities that the target consumers will utilize the network service. The device may aggregate the utilization states of the target consumers to determine penetration rates for the network service, and may perform one or more actions based on the penetration rates for the network service.

20 Claims, 11 Drawing Sheets

(56) References Cited

U.S. PATENT DOCUMENTS

| | | | | |
|---|---|---|---|---|
| 2022/0414692 | A1 * | 12/2022 | Shariff | G06Q 30/0202 |
| 2023/0024900 | A1 * | 1/2023 | Ayoola | B60L 55/00 |
| 2023/0342597 | A1 * | 10/2023 | Behl | G06N 3/044 |
| 2023/0342617 | A1 * | 10/2023 | Behl | G06N 3/088 |

* cited by examiner

| Geography | | | | Penetration since open for sale (%) | | | | | |
| --- | --- | --- | --- | --- | --- | --- | --- | --- | --- |
| City | State | Zip Code | Household Count | Month1 | Month 2 | Month 3 | | Month 59 | Month 60 |
| City 1 | MA | 02117 | 1,933 | 4.5 | 10.2 | 13.0 | | 27.8 | 27.9 |
| City 2 | DE | 01607 | 1,810 | 3.8 | 9.1 | 11.2 | | 24.4 | 24.5 |
| City 3 | PA | 01057 | 2,154 | 3.9 | 9.6 | 11.8 | | 25.2 | 25.4 |

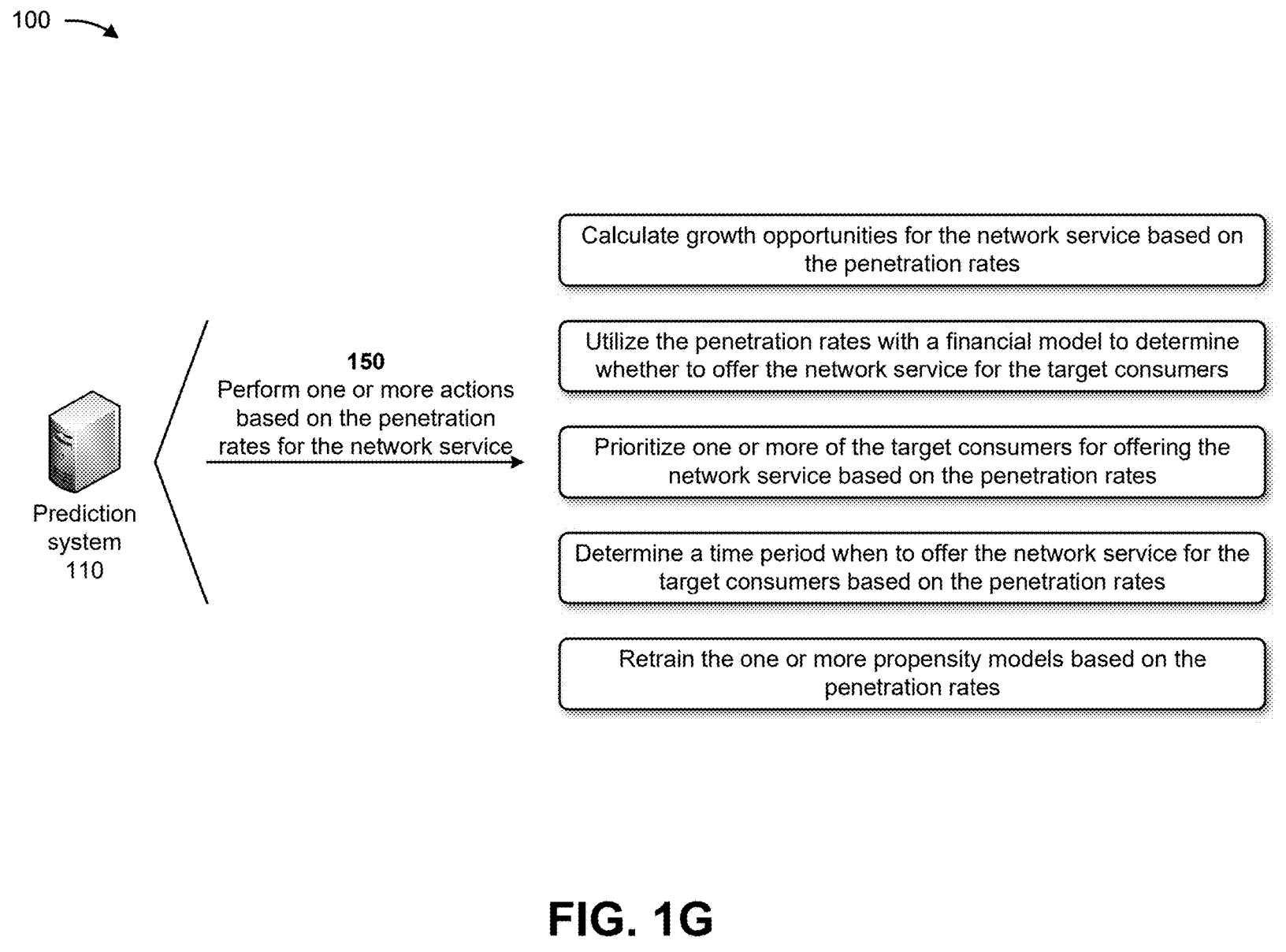

100

Prediction system 110

150
Perform one or more actions based on the penetration rates for the network service Calculate growth opportunities for the network service based on the penetration rates Utilize the penetration rates with a financial model to determine whether to offer the network service for the target consumers Prioritize one or more of the target consumers for offering the network service based on the penetration rates Determine a time period when to offer the network service for the target consumers based on the penetration rates Retrain the one or more propensity models based on the penetration rates

FIG. 1G

SYSTEMS AND METHODS FOR QUANTIFYING NETWORK GROWTH USING ARTIFICIAL INTELLIGENCE AND MACHINE LEARNING MODELS

BACKGROUND

Consumers (e.g., households) may subscribe to different network services, such as a broadband Internet service that encompasses a range of technologies utilized to facilitate high-speed Internet connectivity to the consumers. These technologies include, but are not limited to, digital subscriber lines, coaxial cable networks, wireless communication systems, and optical fiber infrastructures.

BRIEF DESCRIPTION OF THE DRAWINGS

FIGS. 1A-1G are diagrams of an example associated with quantifying growth opportunities of a network service.

DETAILED DESCRIPTION OF EXAMPLE EMBODIMENTS

Figure 1A:
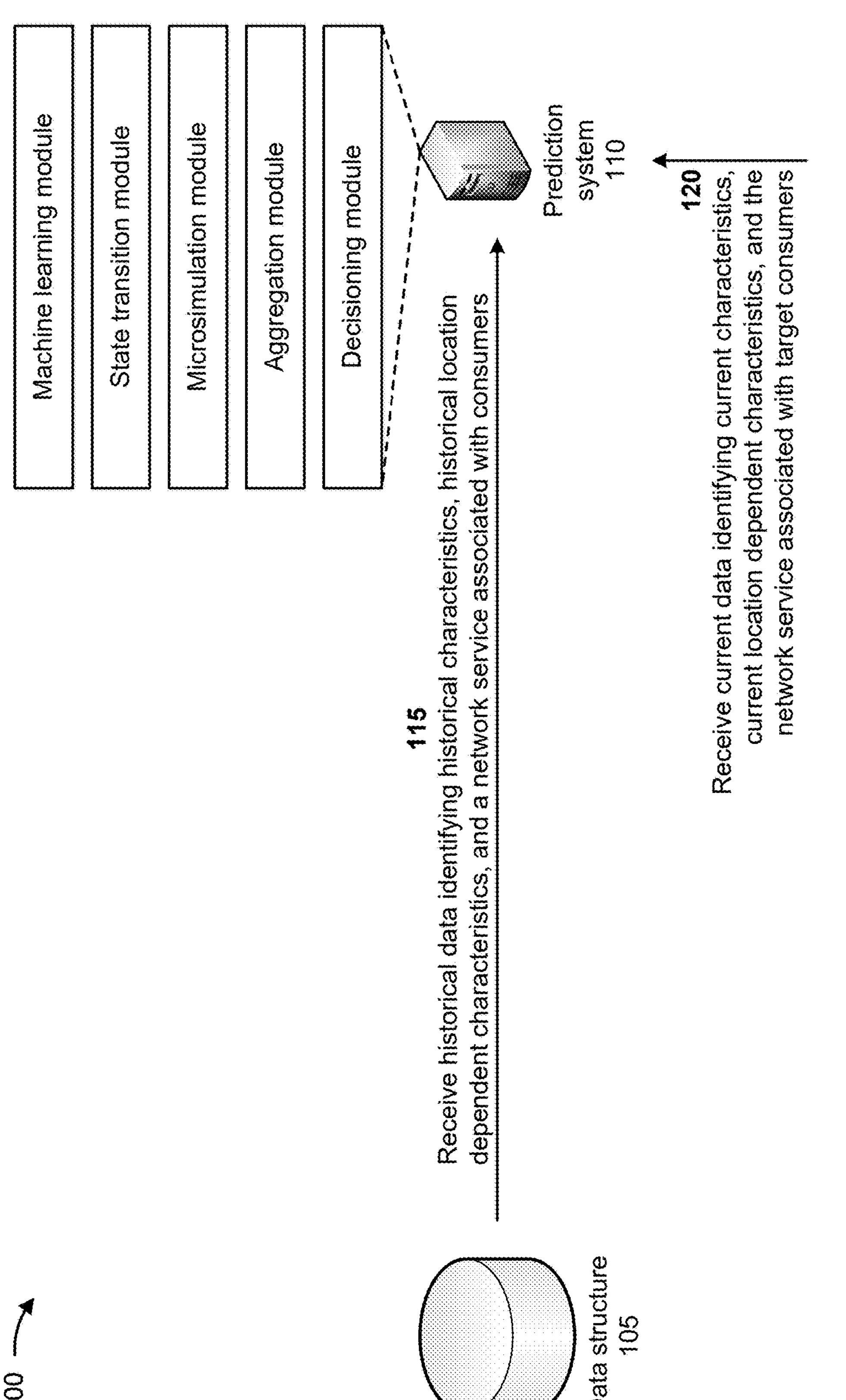

The following detailed description of example implementations refers to the accompanying drawings. The same reference numbers in different drawings may identify the same or similar elements.

There is an increasing demand for network services, such as broadband Internet services. Consequently, Internet service providers (ISPs) are under pressure to expand their broadband infrastructure to accommodate a growing quantity of households, businesses, or consumers seeking high-speed and high bandwidth Internet connectivity. However, ISPs face significant challenges when determining where and how to deploy new broadband technologies, such as optical fiber, which offers the highest upload and download speeds. The deployment of such technologies requires substantial capital investment and involves complex operational decisions. Accurately forecasting a quantity of new customers, revenue the new customers will generate, and the duration for which the new customers will remain subscribed is critical for making informed decisions regarding network expansion. Achieving an accurate projection of customer growth over time is essential for creating financial models that inform strategic decisions on network expansion and service offerings.

Current techniques for forecasting network service deployment are faced with the complexities of diverse technologies, capacity constraints, market and economic dynamics, and the need for strategic financial planning. Such techniques often rely on historical data and standard financial models that may not adequately capture the dynamic and individualized nature of customer behavior and market conditions. Thus, current techniques for forecasting network service deployment consume computing resources (e.g., processing resources, memory resources, communication resources, and/or the like), networking resources, and/or other resources associated with overestimating potential customer utilization of a network service that leads to excessive capital investment with insufficient returns, underestimating potential customer utilization of a network service that results in missed opportunities for improved service performance, and/or the like.

Some implementations described herein provide a prediction system that predicts and quantifies growth opportunities of a network service. For example, the prediction system may receive data identifying characteristics, behaviors, and network services associated with target consumers and characteristics of consumers typical of those in a geographic location, and may process the data, with one or more propensity models, to determine propensities of the target consumers of the network service, such as households to utilize the network service. The prediction system may process the data and the propensities, with a state transition model, to calculate probabilities that the target consumers will choose to utilize the network service, and may determine utilization states of the target consumers over time based on the probabilities that the target consumers will utilize the network service. The prediction system may aggregate the utilization states of the target consumers to determine penetration rates for the network service, and may perform one or more actions based on the predicted penetration rates for the network service.

In this way, the prediction system quantifies growth opportunities of a network service. For example, the prediction system may receive data, such as historical data of individual consumer characteristics and characteristics of consumers typical of those in a geographic location, and may process the data to calculate propensities of the consumers to transition between states, such as unserved by the network service, capable of being served by the network service, and customer of the network service. The prediction system may output growth opportunities for the network service in geographic regions over time based on the transitions of the consumers between the states. The prediction system may adjust the growth opportunities based on external factors, such as workforce availability and engineering capabilities in the geographic regions, and may test different network service deployment scenarios to identify an optimal strategy for network service expansion. Thus, the prediction system may conserve computing resources, networking resources, and/or other resources that would have otherwise been consumed by overestimating potential customer utilization of a network service that leads to excessive capital investment with insufficient returns, underestimating potential customer utilization of a network service that results in missed opportunities for improved service performance, and/or the like.

FIGS. 1A-1G are diagrams of an example 100 associated with predicting and quantifying growth opportunities of a network service. As shown in FIGS. 1A-1G, example 100 includes a data structure 105 associated with a prediction system 110. The data structure 105 may include a data structure (e.g., a data repository, a database, a table, a list, and/or the like) that stores data associated with consumers utilizing a network service, such as households utilizing a network service and target consumers, such as households that may potentially utilize the network service. The prediction system 110 may include a system that quantifies growth opportunities of a network service. Further details of the data structure 105 and the prediction system 110 are provided elsewhere herein.

As shown in FIG. 1A, the prediction system 110 may include multiple modules, such as a machine learning module, a state transition module, a microsimulation module, an aggregation module, and a decisioning module. The machine learning module may be any supervised or unsupervised machine learning module that may be designed to generate propensity models associated with growth opportunities of a network service, customer acquisition for the network service, disconnection from the network service, upsell for the network service, revenue from the regression module, and/or the like. The state transition module may assign consumers a state based on the availability of the network service, subscriptions to the network service, one or more network service tiers, and/or the like. The microsimulation module may transition individual consumers between states based on the predictions from propensity models generated by the machine learning module. The aggregation module may aggregate the consumers based on growth opportunities for the network service, market share for the network service, and revenue for the network service over different geographic regions. The decisioning module may execute multiple microsimulations and aggregations for different scenarios associated with whether to and when to enable the network service for consumers. The decisioning module may select a scenario that maximizes growth opportunities and minimizes cost. Further details of the modules are provided elsewhere herein.

As further shown in FIG. 1A, and by reference number 115, the prediction system 110 may receive historical data identifying historical characteristics, characteristics of consumers typical of those in a geographic region, and a network service associated with consumers of a network services such as businesses. For example, households may be occupied by people that make decisions about acquiring a network service (e.g., an Internet service), which network service provider to utilize for the network service, a level of the network service, discontinuing the network service from a current network service provider. These decisions may depend on demographic information of the consumers and/or people, such as ages, incomes, educations, property types, and other characteristics associated with living conditions and locations or characteristics of businesses such as services/products provided, revenue, and market share. The prediction system 110 may receive historical data identifying such historical characteristics, historical geographic information, and the network service, and may examine the historical data to determine retrospectively what actions the households have historically taken with respect to the network service. In some implementations, the prediction system 110 may receive the historical data from a variety of sources, such as census sources, network provider sources, real estate property sources, and/or the like.

The historical characteristics of the consumers, such as the households may be described by a set of features. The features may include household level demographic features, such as head of household age, education, and household income. The features may also include information about property, such as whether a household is a multi-dwelling unit or a single-family unit. Furthermore, the features may include behavioral features, such as a propensity of a household to include a gamer. The features may include specific area features, such as service provider competition in an area, and census features, such as a population density and vacancy rates. The features may include time dependent features, such as how long the property has been capable for a service provider to provide the network service, and intervention features, such as marketing campaigns conducted in the area, as correlated with network service acquisition. The prediction system 110 may create a dataset of features describing consumers, such as households based on the historical data.

As further shown in FIG. 1A, and by reference number 120, the prediction system 110 may receive current data identifying current characteristics, characteristics of consumers typical of those in a geographic region (e.g., location dependent characteristics), and the network service associated with target consumers. For example, the prediction system 110 may identify target households as households that do not currently subscribe to the network service, and may receive the current data from a variety of sources, such as such as census sources, network provider sources, real estate property sources, and/or the like. The current characteristics of the target households may be described by a set of features. The features may include target household level demographic features, such as head of household age, education, and household income. The features may also include information about property, such as whether a target household is a multi-dwelling unit or a single-family unit. Furthermore, the features may include behavioral features, such as a propensity of a target household to include a gamer. The features may include specific area features, such as service provider competition in an area, and census features, such as a population density and vacancy rates. The features may include time dependent features, such as how long the property has been capable for a service provider to provide the network service, and intervention features, such as marketing campaigns conducted in the area, as correlated with network service acquisition. The prediction system 110 may create a dataset of features describing target households based on the current data.

Figure 1B:
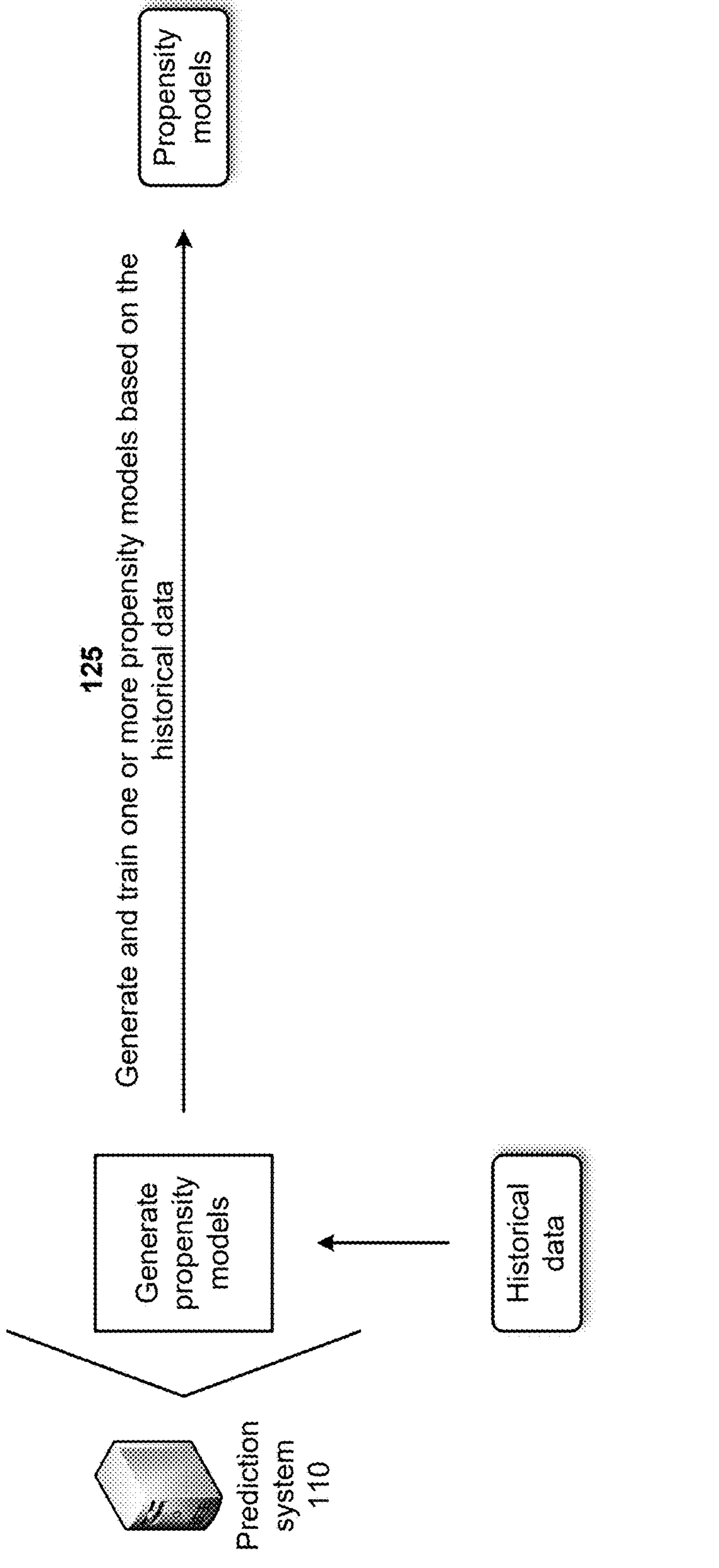

As shown in FIG. 1B, and by reference number 125, the prediction system 110 may generate and train one or more propensity models based on the historical data. For example, the prediction system 110 may utilize the historical data to generate and train models, such as supervised machine learning models that generate probabilities that households with similar characteristics will take in the future. In some implementations, the supervised machine learning models may be associated with household acquisition of the network service and household disconnection from the network service. Alternatively, supervised machine learning models may be associated with a plan change and/or revenue generated by the network service. An output of the supervised machine learning models may include a probability that a target household will take on characteristic that the supervised machine learning models are predicting over a time period (e.g., a month).

In some implementations, the prediction system 110 may generate and train propensity machine learning models based on the historical data. A snapshot date may be utilized and may be defined as a beginning date from which a propensity machine learning model will predict a behavior of a target household. A population may be defined as a set of target consumers, such as households for which a propensity machine learning model will predict a behavior. A target behavior may be defined as a behavior of a target consumer, such as a household changing between the snapshot date and a defined period after the snapshot date. In some implementations, each of the one or more propensity models may include a logistic regression model, a support vector machine model, a random forest model, a gradient boosting model, a neural network model, and/or like. In some implementations, each of the one or more propensity models may include a propensity model for customer acquisition, a propensity model for customer disconnection, a propensity model for a plan change, and/or the like.

In the propensity model for customer acquisition, the population may include all target consumers, such as businesses and households capable of acquiring the network service but that currently do not have the network service (e.g., as of a snapshot date). An output of the propensity model for customer acquisition may be assigned to the positive class if the target household acquires the network service in a time period after the snapshot date, and may be assigned to the negative class if the target household fails to acquire the network service in the time period after the snapshot date. In some implementations, if a service provider offers multiple network service plans, the output of the propensity model for customer acquisition may be multinomial with a class representing which plan a historic household selected.

In the propensity model for customer disconnection, the population may include all target consumers, such as households that currently have the network service from the network service provider. An output of the propensity model for customer disconnection may be assigned to the positive class if the target household disconnects the network service over a time period after the snapshot date, and may be assigned to the negative class if the target household fails to disconnect the network service over the time period after the snapshot date.

In the propensity model for plan change, the population may include all target consumers, such as households that currently have one of a set of existing network service plans and are changing to a different set of network service plans. For example, if the network service plans are based on Internet speeds (e.g., one-hundred megabits per second (mbps), three-hundred mbps, or five-hundred mbps), the propensity model for plan change may be utilized for the target households with a plan of one-hundred mbps and upgrading to plan of three-hundred mbps over a time period after the snapshot date. Each plan may cost a different amount, and a plan to which the target household is to subscribe may be used to estimate revenue from the target household. If the network service offers many plans, a quantity of propensity models for plan change models may increase exponentially.

In some implementations, one of the propensity models may include a regression model for revenue associated with the network service. Instead of predicting a class, the regression model may predict the revenue from a target household based on characteristics of the target household. The population for the regression model may include all target households that currently have the network service, that generate an average revenue over a time period after the snapshot date. In some implementations, the prediction system 110 may generate the one or more propensity models based on features of the target households that are independent of any network service usage. Alternatively, the prediction system 110 may generate the one or more propensity models based on patterns and levels of network service usage (e.g., using assumptions and/or projections).

Figure 1C:
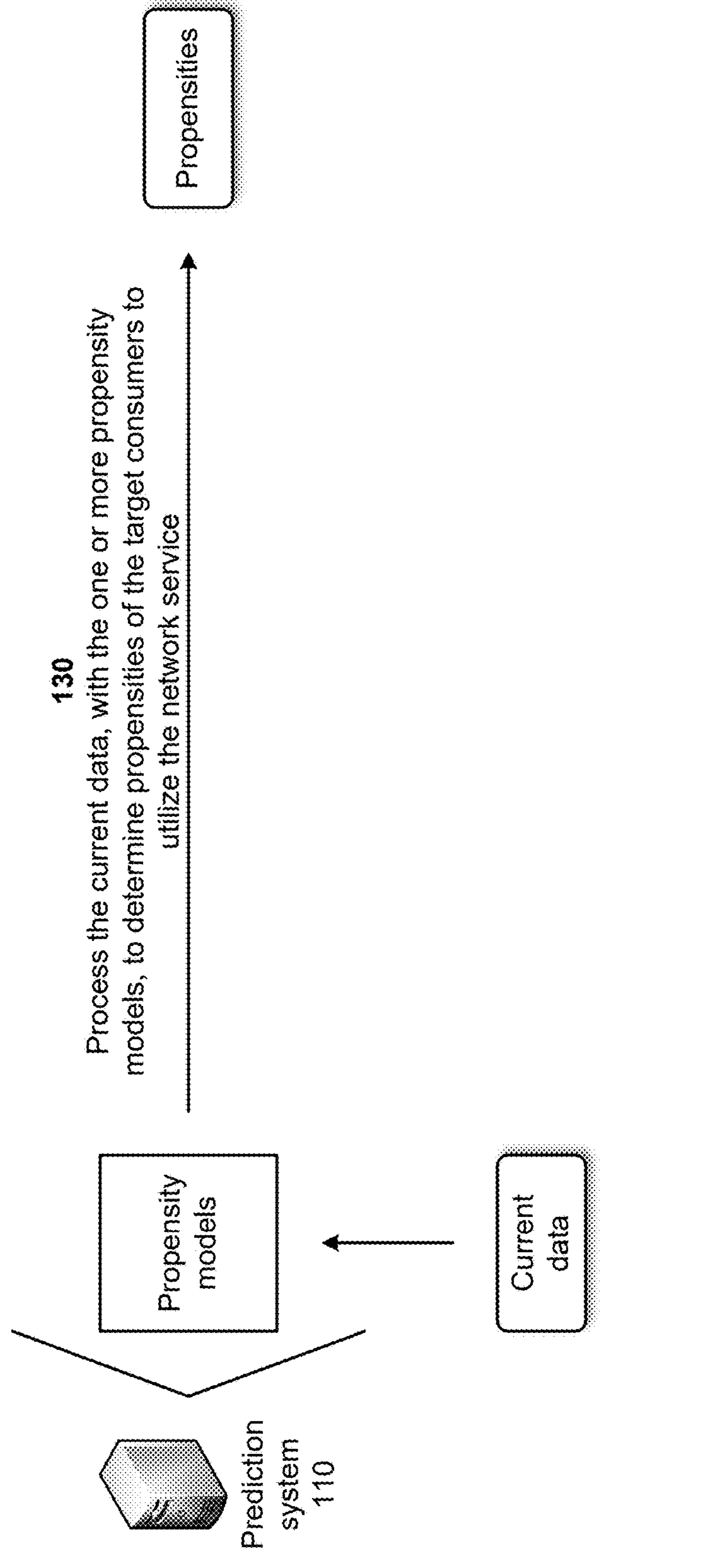

As shown in FIG. 1C, and by reference number 130, the prediction system 110 may process the current data, with the one or more propensity models, to determine propensities of the target households to utilize the network service. For example, the prediction system 110 may utilize the one or more propensity models to determine the propensities of the target households to utilize the network service based on the current data. The propensity models output a score which can be calibrated to represent a probability that the household acquires the network service over a given time period such as a month. The prediction system 110 may process the current data, with the propensity model for customer acquisition, to determine the probabilities of the target households to acquire the network service. For example, the output of the propensity model for customer acquisition may be large if the target household is likely to acquire the network service in a time period after the snapshot date, and may be small if the target household is not likely to acquire the network service in the time period after the snapshot date.

The prediction system 110 may process the current data, with the propensity model for customer disconnection, to determine the propensities of the target households to utilize the network service. The propensity models output a score which can be calibrated to represent a probability that the household disconnects from the network service over a given time period such as a month. For example, the output of the propensity model for customer disconnection may be large if the target household is likely to disconnect the network service over a time period after the snapshot date, and may be small if the target household is not likely to disconnect the network service over the time period after the snapshot date. In some implementations, the prediction system 110 may process the current data, with the propensity model for plan change, to determine the propensities of the target households to change from an existing set of network service plans to a different set of network service plans. In some implementations, the prediction system 110 may process the current data, with the regression model, to predict revenues from the target households based on the characteristics of the target households.

Figure 1D:
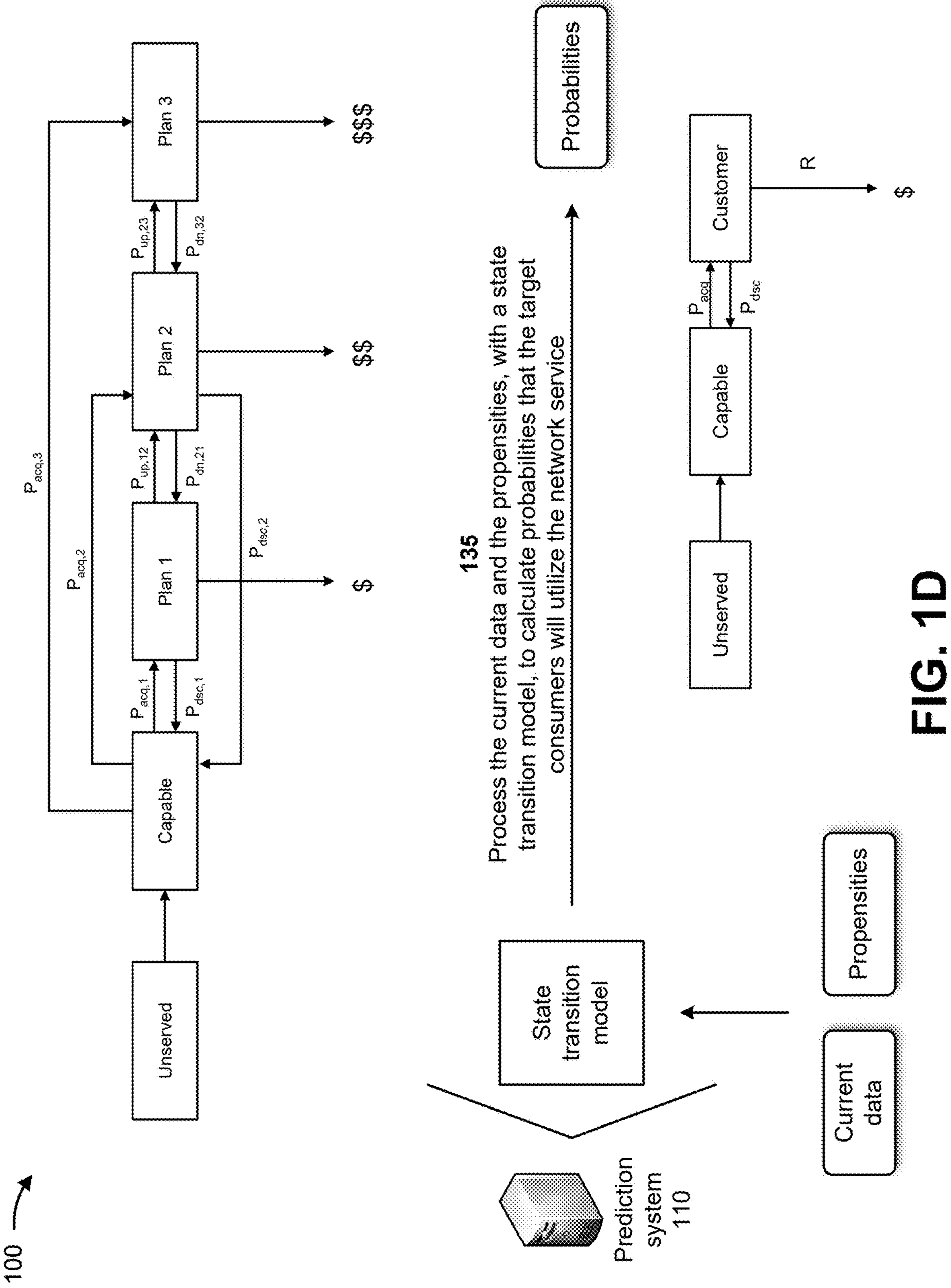

As shown in FIG. 1D, and by reference number 135, the prediction system 110 may process the current data and the propensities, with a state transition model, to calculate probabilities that the target households will utilize the network service. For example as shown at the bottom of FIG. 1D, the prediction system 110 may be associated with a simple state transition model or a complex state transition model. The simple state transition model may include three states (e.g., unserved by the network service, capable of receiving the network service, and a network service customer). All households where the network service provider has not yet provided the network service may be in the unserved state. A probability that a household will transition from the unserved state to the network service capable state may be zero as long as a geographic region associated with the household remains unserved, and may be one when the network service is available in the geographic region.

Each time period (e.g., a month), all the households that are in the network service capable state have a probability $P_{acq}$ of transitioning to a network service customer state. $P_{acq}$ may be the output of the propensity model for customer acquisition and may be a different value for each household. Each time period, all the households that are in the network service customer state have a probability $P_{dsc}$ of transitioning back to the network service capable state if they discontinue the network service. $P_{dsc}$ is the output of the propensity model for customer disconnection and may be a different value for each household. Each month, households that are in the network service customer state may generate revenue R, where R is the output of the revenue regression model and may be different for each household.

As further show at the top of FIG. 1D, the complex state transition model may include the unserved state, the capable state, the network service customer state, and three network service plans (e.g., plans 1, 2, and 3). As in the simple state transition model, the transition from the unserved state to the network service customer state may depend on whether the households in the geographic area will be provided the network service. In some implementations, the prediction system 110 may utilize a multinomial acquisition model (e.g., for served households) to predict household dependent probabilities $P_{acq,1}$, $P_{acq,2}$, and $P_{acq,3}$ of a household transitioning to plans 1, 2, and 3, respectively. The prediction system 110 may utilize a multinomial disconnection model to predict probabilities $P_{dsc,1}$, $P_{dsc,2}$, and $P_{dsc,3}$ that network service customers disconnect from plans 1, 2, and 3, respectively. The prediction system 110 may approximate that a propensity to disconnect from any plan is independent of the plan and may utilize a model to predict $P_{dsc}$. In some implementations, the prediction system 110 may utilize a set of models to predict a probability $P_{ij}$ to change plans from plan i to plan j, where each plan i generates a revenue $R_i$ when the household is in the state of that plan.

Figure 1E:
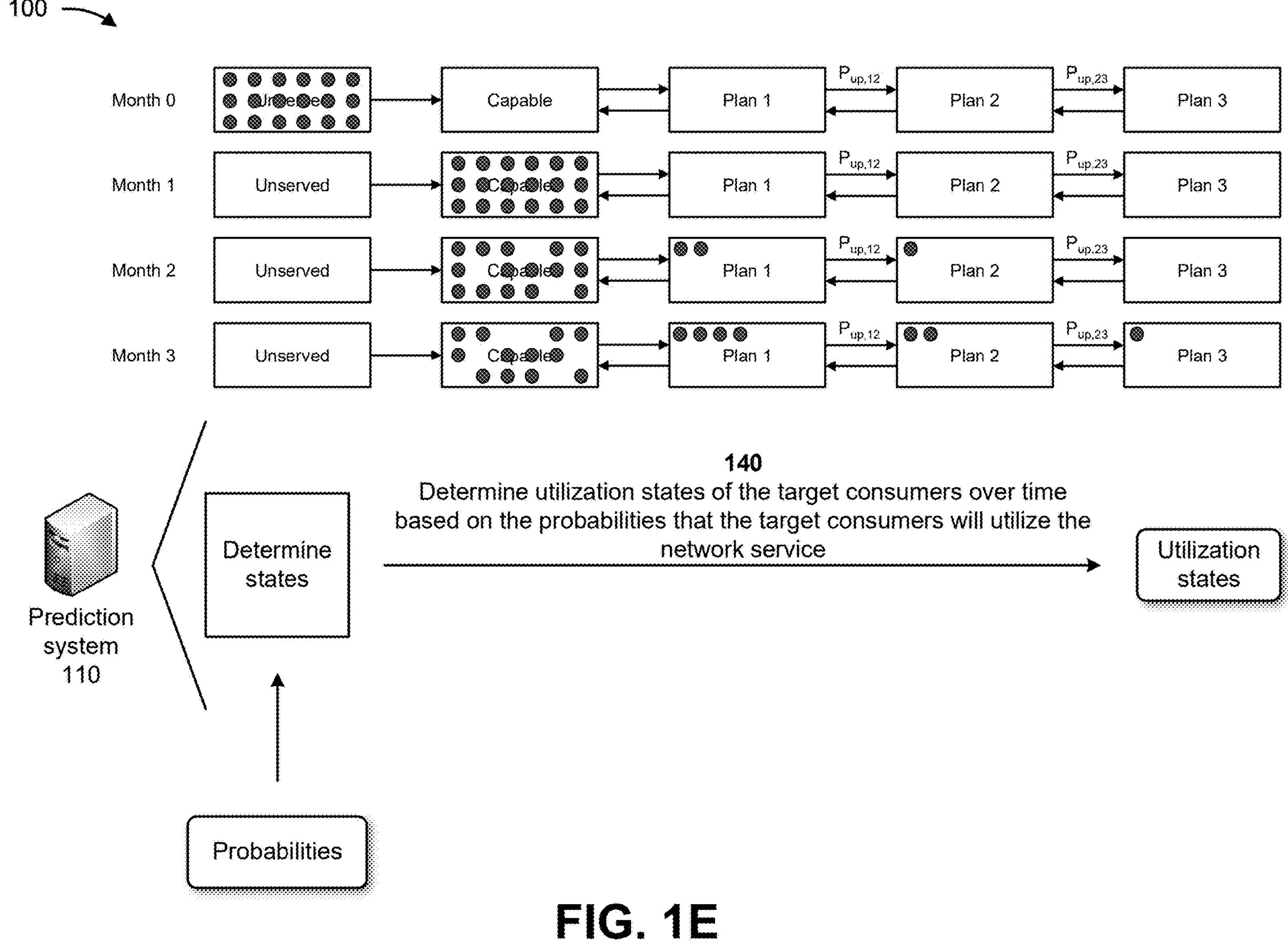

As shown in FIG. 1E, and by reference number 140, the prediction system 110 may determine utilization states of the target households over time based on the probabilities that the target households will utilize the network service. For example, the prediction system 110 may utilize a microsimulation to determine the utilization states of the target households over time based on the probabilities that the target households will utilize the network service. The top of FIG. 1E provides an example of how the prediction system 110 may utilize the microsimulation to progress a state of the households over time. For this example, the complex state transition model shown in FIG. 1D may be utilized (e.g., with three network service plans). In this example, a set of eighteen (18) households are in a geographic region that is unserved with the network service. This situation may be represented graphically by placing all eighteen households in the unserved state in month 0 of the simulation.

During the course of month 0, the network service may be deployed and the households may be capable of being served. Therefore, in the simulation in month 1, all households move from the unserved state to the network service served state as illustrated in row two of the figure. During the course of month 1, each household has a household dependent probability of acquiring the network service. If the situation in FIG. 1D, where a household could purchase any plan, is to be accurately represented, arrows may be drawn connecting all plan levels. To simplify the figure, all possible transitions are not shown, except for sequential transitions.

All consumers (e.g., in this implementation may include households) may have a household dependent probability of transitioning from the network service capable state to a network service plan 1 subscriber state. The prediction system 110 may sample a random number from a uniform distribution between zero and one for each household for each possible transition. If the random number is greater than the probability of transition, then the household remains BB capable. If the random number is less than the probability of transition, then the household changes states. In the example, the random number sampled was less than the transition probability to network service plan 1 for the fourth household in row one and the second household in row two. The random number sampled was less than the transition probability to network service plan 2 for the fifth household in row three. Therefore, in month 2, fifteen (15) households remain network service capable, two households are subscribers to network service plan 1, and one household is a subscriber to network service plan 2. Similar transitions may occur throughout the course of month 3. After month 3, there may be seven subscribers (e.g., four to network service plan 1, two to network service plan 2, and one to network service plan 3). In a real scenario, where there are thousands of households, many transitions may occur each month. The transitions may repeat monthly throughout the length of the simulation.

Figure 1F:
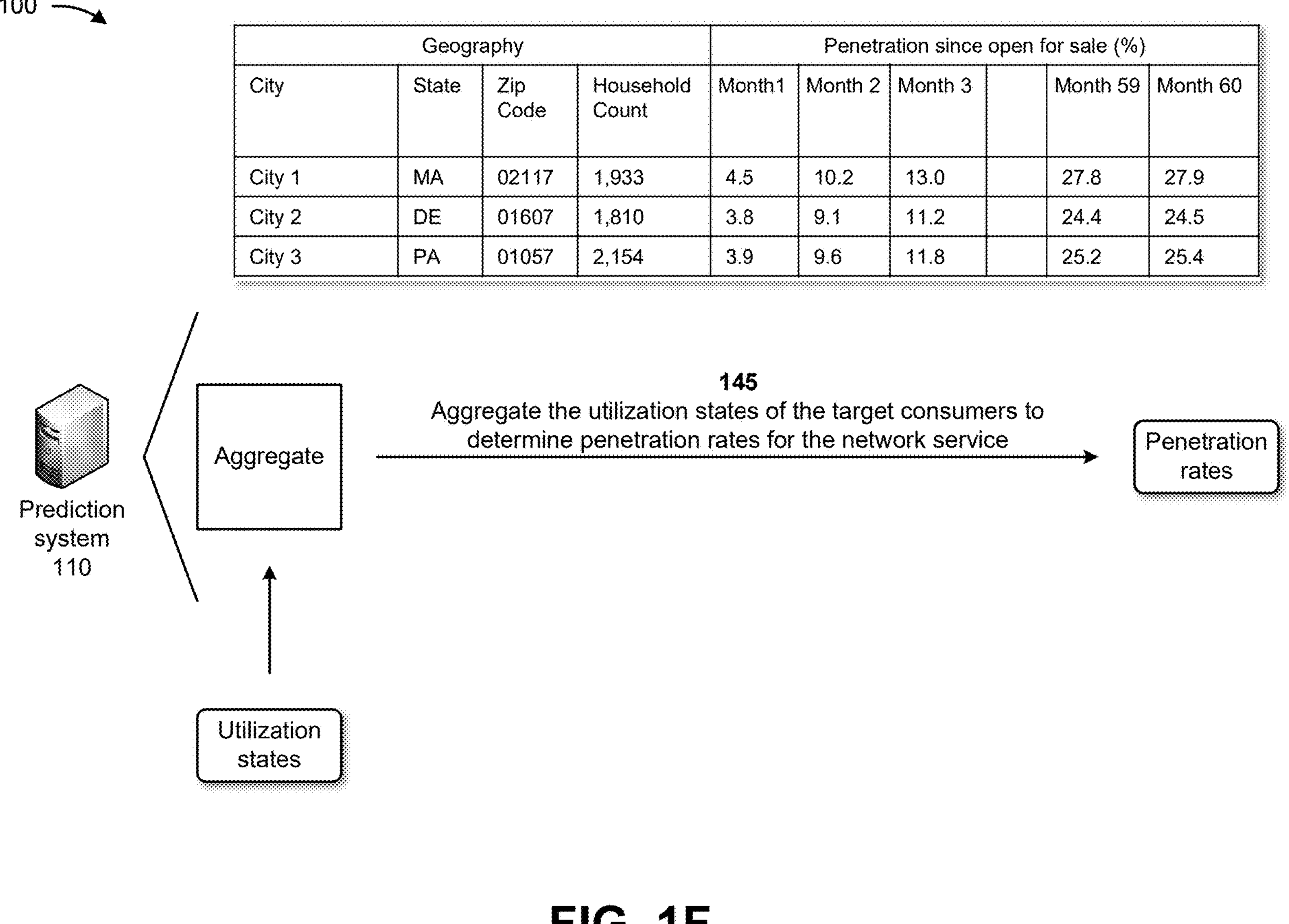

As shown in FIG. 1F, and by reference number 145, the prediction system 110 may aggregate the utilization states of the target households to determine penetration rates for the network service. For example, the microsimulation module of the prediction system 110 may process the states at the individual consumer level, such as a household level, as described above in connection with FIG. 1E. Because the microsimulation module utilizes a probabilistic model, the results fail to represent the network service behavior at each household level, and with only one possible behavior out of many that may occur. However, the prediction system 110 may aggregate the results (e.g., the utilization states of the target households) to a coarser granularity, such as a wire center, a block group, a zip code, and/or the like, the results become closer to what will actually be observed (e.g., the penetration rates for the network service). The top of FIG. 1F shows an example of calculated penetration rates for the network service in three cites over a sixty month period. As shown, a first city (e.g., City 1) may have a penetration rate for the network service of 4.5% in the first month and 27.9% for month sixty; a second city (e.g., City 2) may have a penetration rate for the network service of 3.8% in the first month and 24.5% for month sixty; and a third city (e.g., City 3) may have a penetration rate for the network service of 3.9% in the first month and 25.4% for month sixty.

In some implementations, the prediction system 110 may calculate a penetration or market share of the network service based on the utilization states of the target households. The market share may be calculated from a ratio of a quantity of customers in each region to a quantity of households in that region. For example, if in month 24 there are 10,000 households that are network service capable, with 3,000 households subscribing to plan 1, 2,000 households subscribing to plan 2, and 1,000 households subscribing to plan 3, then the market share is 60%. The market share may also be represented on an individual plan basis. The market share may initially be small when the network service is first offered and may grow to some saturated level where approximately an equivalent quantity of households are being acquired as are disconnecting.

In some implementations, the prediction system 110 may calculate revenue in each region based on the utilization states of the target households. In some implementations, where there is only a network service subscriber state, the revenue model may be executed for each subscriber household to obtain a predicted monthly revenue. These revenues may be summed over the geographic region, providing an estimate of monthly revenue. In some implementations, where there are multiple plans, the revenue associated with each plan may be summed over all the households subscribing to the plans, again providing a monthly revenue for the region. In some implementations, prediction system 110 may utilize the market share and the monthly revenue by month for each geographic region to generate tables, present dashboards, act as input to a financial model, and/or the like.

As shown in FIG. 1G, and by reference number 150, the prediction system 110 may perform one or more actions based on the penetration rates for the network service. In some implementations, performing the one or more actions includes the prediction system 110 calculating growth opportunities for the network service based on the penetration rates. For example, the prediction system 110 may utilize the penetration rates to determine growth opportunities for the network service in different geographic regions, and a user of the prediction system 110 (e.g., a network service provider) may determine whether to enter into the different geographic regions based on the growth opportunities. In this way, the prediction system 110 conserves computing resources, networking resources, and/or other resources that would have otherwise been consumed by overestimating potential customer utilization of a network service that leads to excessive capital investment with insufficient returns.

In some implementations, performing the one or more actions includes the prediction system 110 utilizing the penetration rates with a financial model to determine whether to offer the network service for the target households. For example, the prediction system 110 may utilize the penetration rates with a financial model that predicts revenue generated by the network service over time. A user of the prediction system 110 may determine whether to offer the network service to a particular group of target households based on the predicted revenue generated by the network service for the group of target households. In this way, the prediction system 110 conserves computing resources, networking resources, and/or other resources that would have otherwise been consumed by underestimating potential customer utilization of a network service that results in missed opportunities for improved service performance.

In some implementations, performing the one or more actions includes the prediction system 110 prioritizing one or more of the target households for offering the network service based on the penetration rates. For example, the prediction system 110 may determine the most cost-effective and profitable target households to deploy the network service based on the penetration rates, and may prioritize the most cost-effective and profitable target households when offering the network service. In this way, the prediction system 110 conserves computing resources, networking resources, and/or other resources that would have otherwise been consumed by overestimating potential customer utilization of a network service that leads to excessive capital investment with insufficient returns.

In some implementations, performing the one or more actions includes the prediction system 110 determining a time period when to offer the network service for the target households based on the penetration rates. For example, the prediction system 110 may determine that it is more profitable to offer the network service for the target household in warmer months based on the penetration rates since it is more expensive to build infrastructure in the colder months. Thus, the prediction system 110 may recommend the warmer months for offering the network service for the target households. In this way, the prediction system 110 conserves computing resources, networking resources, and/or other resources that would have otherwise been consumed by underestimating potential customer utilization of a network service that results in missed opportunities for improved service performance.

In some implementations, performing the one or more actions includes the prediction system 110 retraining the one or more propensity models based on the penetration rates. For example, the prediction system 110 may utilize the penetration rates as additional training data for retraining the one or more propensity models, thereby increasing the quantity of training data available for training the one or more propensity models. Accordingly, the prediction system 110 may conserve computing resources associated with identifying, obtaining, and/or generating historical data for training the one or more propensity models relative to other systems for identifying, obtaining, and/or generating historical data for training machine learning models.

In this way, the prediction system 110 quantifies growth opportunities of a network service. For example, the prediction system 110 may receive data, such as historical data and geographic information associated with households, and may process the data to calculate propensities of the households to transition between states, such as unserved by the network service, capable of being served by the network service, and customer of the network service. The prediction system 110 may output growth opportunities for the network service in geographic regions over time based on the transitions of the households between the states. The prediction system 110 may adjust the growth opportunities based on external factors, such as workforce availability and engineering capabilities in the geographic regions, and may test different network service deployment scenarios to identify an optimal strategy for network service expansion. Thus, the prediction system 110 may conserve computing resources, networking resources, and/or other resources that would have otherwise been consumed by overestimating potential customer utilization of a network service that leads to excessive capital investment with insufficient returns, underestimating potential customer utilization of a network service that results in missed opportunities for improved service performance, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
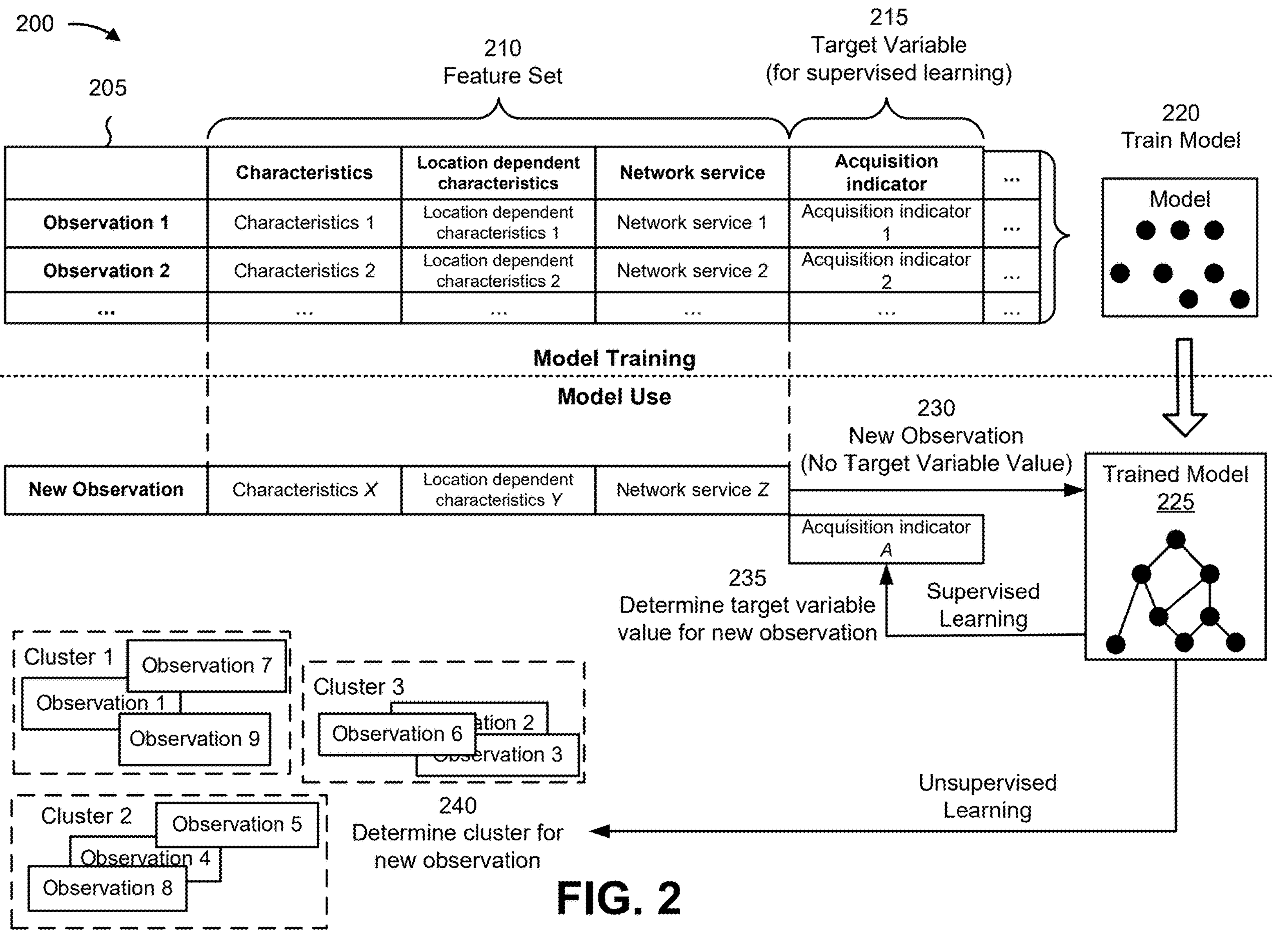
FIG. 2 is a diagram illustrating an example of training and using a machine learning model.

FIG. 2 is a diagram illustrating an example 200 of training and using a machine learning model for quantifying growth opportunities of a network service. The machine learning model training and usage described herein may be performed using a machine learning system. The machine learning system may include or may be included in a computing device, a server, a cloud computing environment, and/or the like, such as the prediction system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the prediction system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the prediction system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of characteristics, a second feature of location dependent characteristics, a third feature of a network service, and so on. As shown, for a first observation, the first feature may have a value of characteristics 1, the second feature may have a value of location dependent characteristic 1, the third feature may have a value of network service 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "acquisition indicator" and may include a value of one if the customer acquired the broadband service in a future time period such as a month after the snapshot date and a value of zero if the customer did not acquire the broadband service.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first set of features of characteristics X, a second set features of location dependent characteristic Y, a third set of features of network service Z, and so on, as an example. The machine learning system may apply the trained machine learning model 225 to the new observation to generate an output (e.g., a result). The type of output may depend on the type of machine learning model and/or the type of machine learning task being performed. For example, the output may include a propensity score for a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of acquisition indicator A for the target variable of the propensities for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a characteristics cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a geographic information cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to quantify growth opportunities of a network service. The machine learning system enables recognition and/or identification of tens, hundreds, thousands, or millions of features and/or feature values for tens, hundreds, thousands, or millions of observations, thereby increasing accuracy and consistency and reducing delay associated with quantifying growth opportunities of a network service relative to requiring computing resources to be allocated for tens, hundreds, or thousands of operators to manually quantify growth opportunities of a network service.

As indicated above, FIG. 2 is provided as an example. Other examples may differ from what is described in connection with FIG. 2.

Figure 3:
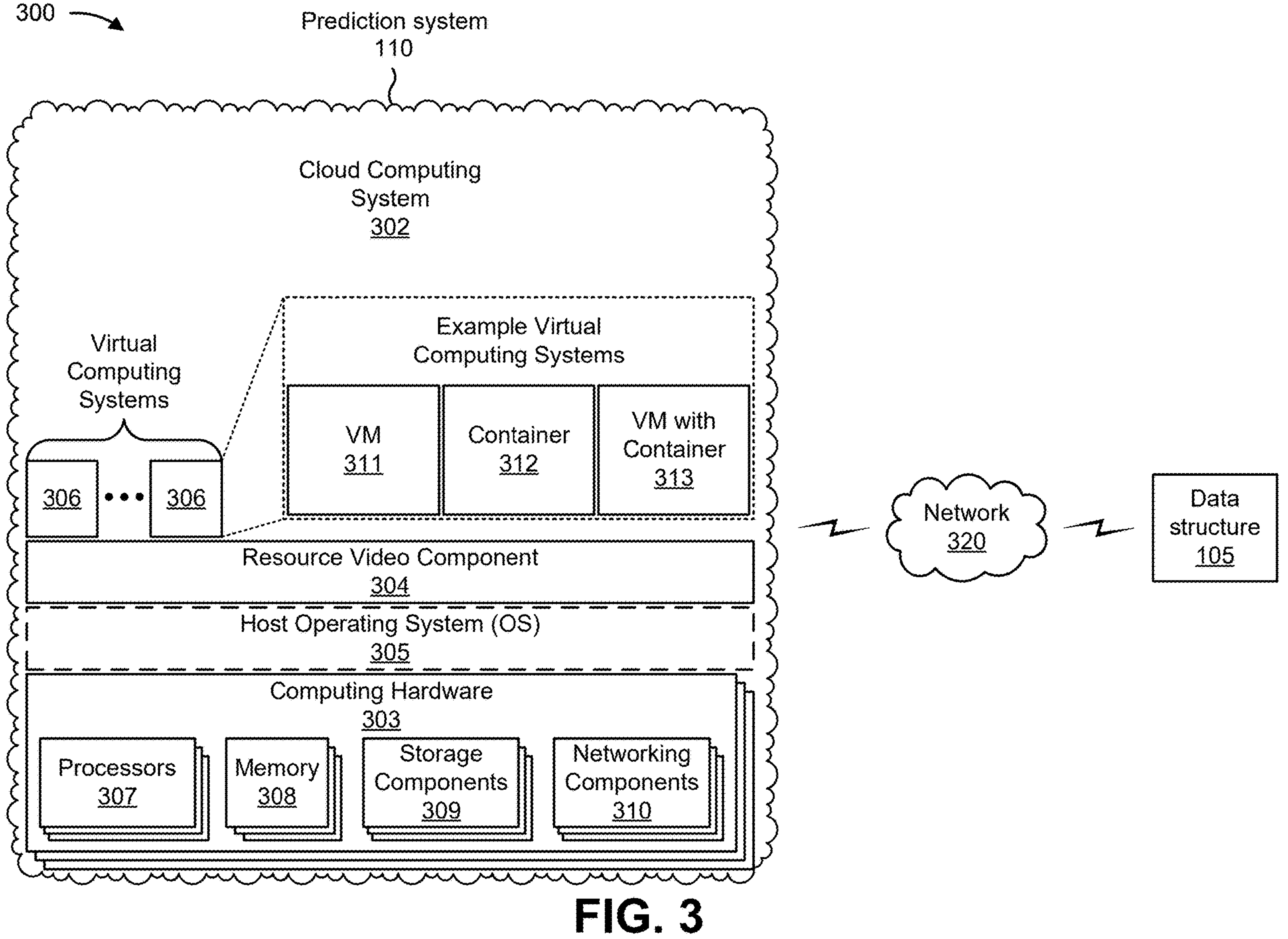
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the prediction system 110, which may include one or more elements of and/or may execute within a cloud computing system 302. The cloud computing system 302 may include one or more elements 303-313, as described in more detail below. As further shown in FIG. 3, the environment 300 may include the data structure 105 and/or a network 320. Devices and/or elements of the environment 300 may interconnect via wired connections and/or wireless connections.

The data structure 105 may include one or more devices capable of receiving, generating, storing, processing, and/or providing information, as described elsewhere herein. The data structure 105 may include a communication device and/or a computing device. For example, the data structure 105 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 105 may communicate with one or more other devices of the environment 300, as described elsewhere herein.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the prediction system 110 may include one or more elements 303-313 of the cloud computing system 302, may execute within the cloud computing system 302, and/or may be hosted within the cloud computing system 302, in some implementations, the prediction system 110 may not be cloud-based (e.g., may be implemented outside of a cloud computing system) or may be partially cloud-based. For example, the prediction system 110 may include one or more devices that are not part of the cloud computing system 302, such as a device 400 of FIG. 4, which may include a standalone server or another type of computing device. The prediction system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
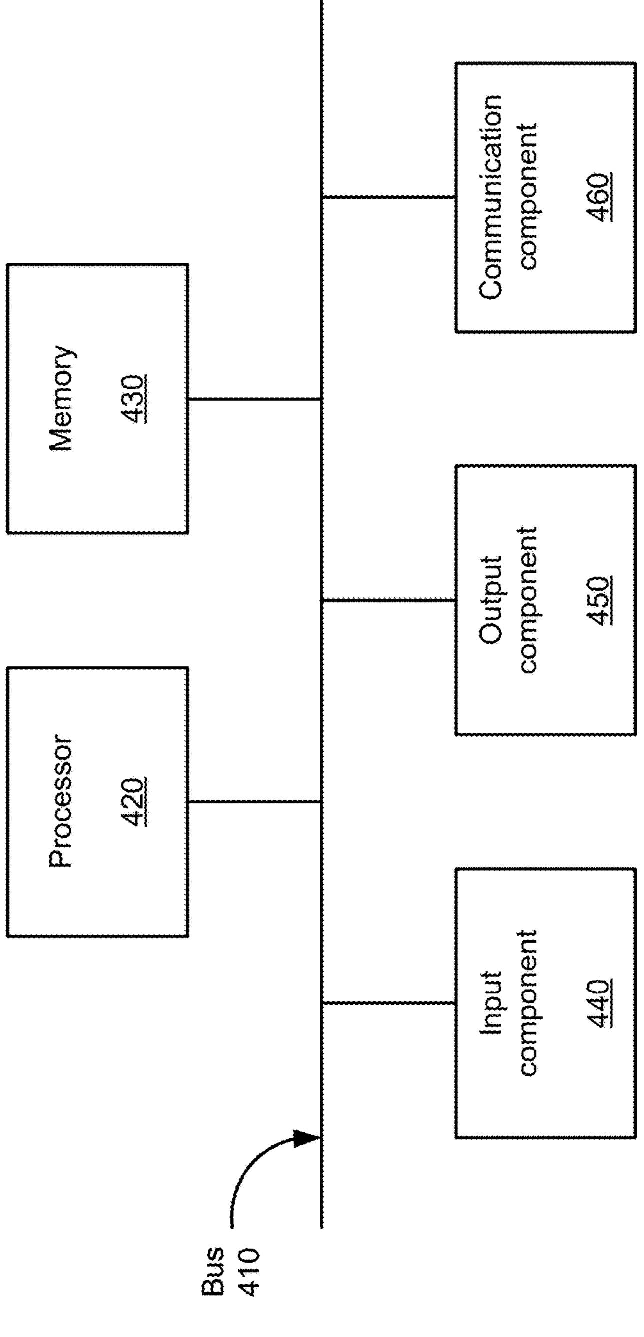
FIG. 4 is a diagram of example components of one or more devices of FIG. 3.

FIG. 4 is a diagram of example components of a device 400, which may correspond to the data structure 105 and/or the prediction system 110. In some implementations, the data structure 105 and/or the prediction system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
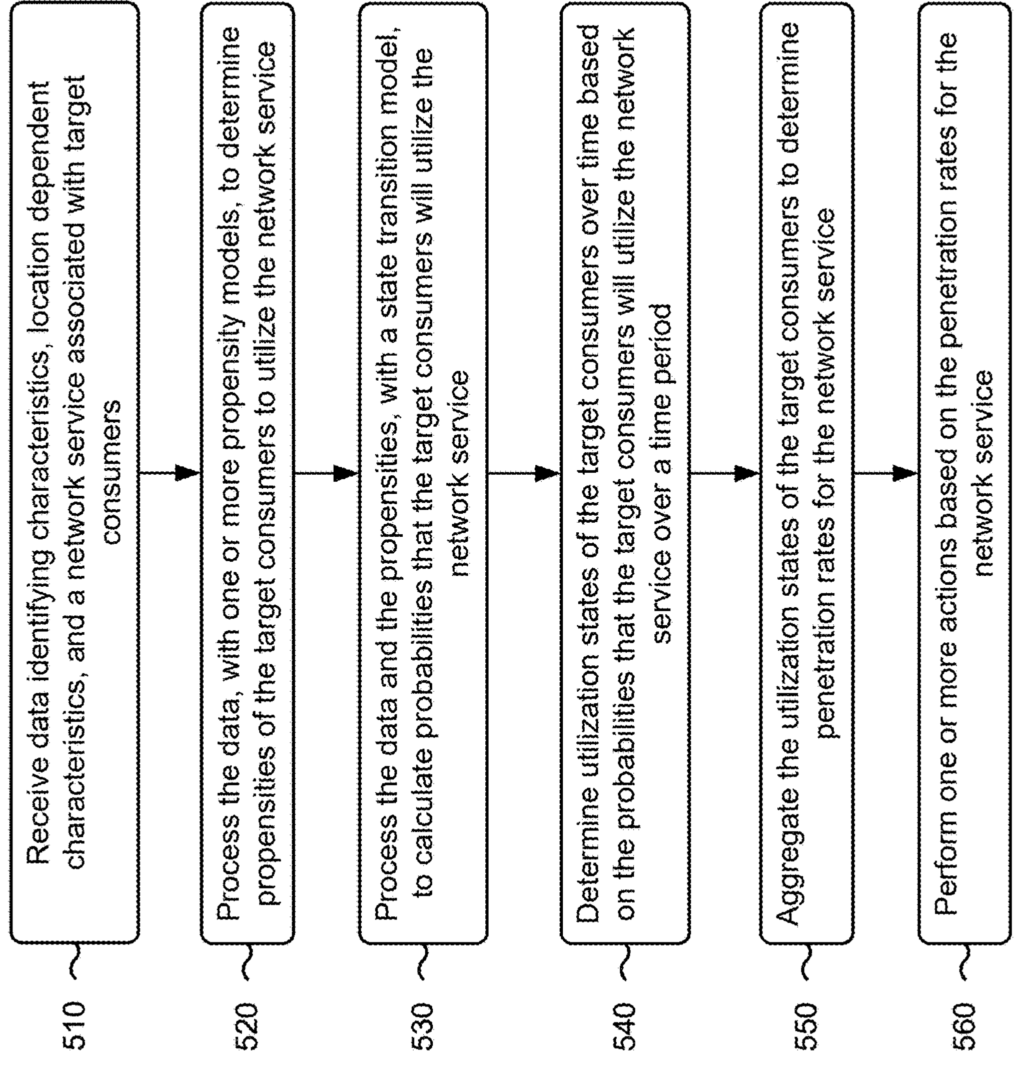
FIG. 5 is a flowchart of an example process for quantifying growth opportunities of a network service.

FIG. 5 depicts a flowchart of an example process 500 for quantifying growth opportunities of a network service. In some implementations, one or more process blocks of FIG. 5 may be performed by a device (e.g., the prediction system 110). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving data identifying characteristics, location dependent characteristics, and a network service associated with target consumers (block 510). For example, the device may receive data identifying characteristics, location dependent characteristics, and a network service associated with target consumers, as described above.

As further shown in FIG. 5, process 500 may include processing the data, with one or more propensity models, to determine propensities of the target consumers to utilize the network service (block 520). For example, the device may process the data, with one or more propensity models, to determine propensities of the target consumers to utilize the network service, as described above. In some implementations, each of the one or more propensity models includes one or more of a logistic regression model, a support vector machine model, a random forest model, an extreme gradient boosting model, or a neural network model. In some implementations, each of the one or more propensity models includes one or more of a propensity model for customer acquisition, a propensity model for customer disconnection, or a propensity model for a plan change.

As further shown in FIG. 5, process 500 may include processing the data and the propensities, with a state transition model, to calculate probabilities that the target consumers will utilize the network service over a time period (block 530). For example, the device may process the data and the propensities, with a state transition model, to calculate probabilities that the target consumers will utilize the network service over a time period, as described above. In some implementations, processing the data and the propensities, with the state transition model, to calculate the probabilities that the target consumers will utilize the network service over a time period includes processing the data and the propensities, with the state transition model, to determine states associated with the target consumers, and calculating the probabilities that the target consumers will utilize the network service based on the states associated with the target consumers. In some implementations, each of the states associated with the target consumers includes one of a network service unserved state, a network service capable state, and a network service customer state.

As further shown in FIG. 5, process 500 may include determining utilization states of the target consumers over time based on the probabilities that the target consumers will utilize the network service over a time period (block 540). For example, the device may determine utilization states of the target consumers over time based on the probabilities that the target consumers will utilize the network service over a time period, as described above. In some implementations, determining the utilization states of the target consumers over time based on the probabilities that the target consumers will utilize the network service over a time period includes processing the probabilities that the target consumers will utilize the network service, with a simulation model, to determine the utilization states of the target consumers over time.

As further shown in FIG. 5, process 500 may include aggregating the utilization states of the target consumers to determine penetration rates for the network service (block 550). For example, the device may aggregate the utilization states of the target consumers to determine penetration rates for the network service, as described above. In some implementations, aggregating the utilization states of the target consumers to determine the penetration rates for the network service includes calculating a ratio of a quantity of network service customers to a total number of the target consumers, in each geographic region of the geographic region, to determine the penetration rates for the network service.

As further shown in FIG. 5, process 500 may include performing one or more actions based on the penetration rates for the network service (block 560). For example, the device may perform one or more actions based on the penetration rates for the network service, as described above. In some implementations, performing the one or more actions based on the penetration rates for the network service includes one or more of calculating growth opportunities for the network service based on the penetration rates, or utilizing the penetration rates with a financial model to determine whether to offer the network service for the target consumers. In some implementations, performing the one or more actions based on the penetration rates for the network service includes prioritizing one or more of the target consumers for offering the network service based on the penetration rates. In some implementations, performing the one or more actions based on the penetration rates for the network service includes one or more of determining a time period when to offer the network service for the target consumers based on the penetration rate, or retraining the one or more propensity models based on the penetration rates.

In some implementations, process 500 includes receiving historical data identifying historical characteristics, historical location dependent characteristics, and the network service associated with a plurality of households, and generating and training the one or more propensity models based on the historical data. In some implementations, process 500 includes adjusting the penetration rates for the network service based on external factors associated with geographic regions identified in the geographic information. In some implementations, process 500 includes adjusting the penetration rates for the network service based on intervention features associated with geographic regions identified in the geographic information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

generating, by a device, via a machine learning module of the device, one or more propensity models, wherein at least one of the one or more propensity models is a supervised machine learning model;

receiving, by the device, data identifying characteristics, location dependent characteristics, and a network service associated with target consumers;

processing, by the device, the data, with the one or more propensity models generated via the machine learning module of the device, to determine propensities of the target consumers to utilize the network service;

processing, by the device, the data and the propensities, with a state transition model of the device, to calculate probabilities that the target consumers will utilize the network service;

processing, by the device, the probabilities that the target consumers will utilize the network service, with a microsimulation module of the device, to determine utilization states of the target consumers over time;

aggregating, by the device, the utilization states of the target consumers, with an aggregation module of the device, to determine penetration rates for the network service;

performing, by the device, one or more actions based on the penetration rates; and retraining, via the machine learning module of the device, the one or more propensity models based on the penetration rates.

2. The method of claim 1, wherein generating the one or more propensity models further comprises:

receiving historical data identifying historical characteristics, historical location dependent characteristics, and the network service associated with a plurality of consumers; and generating and training the one or more propensity models based on the historical data.

3. The method of claim 1, wherein each of the one or more propensity models includes one or more of a logistic regression model, a support vector machine model, a random forest model, a gradient boosting model, or a neural network model.

4. The method of claim 1, wherein each of the one or more propensity models includes one or more of a propensity model for customer acquisition, a propensity model for customer disconnection, a propensity model for revenue, or a propensity model for a plan change.

5. The method of claim 1, wherein processing the data and the propensities, with the state transition model, to calculate the probabilities that the target consumers will utilize the network service comprises:

processing the data and the propensities, with the state transition model, to determine states associated with the target consumers; and calculating the probabilities that the target consumers will utilize the network service based on the states associated with the target consumers.

6. The method of claim 5, wherein each of the states associated with the target consumers includes one of a network service unserved state, a network service capable state, and a network service customer state.

7. The method of claim 1, further comprising:

storing the data in a data structure.

8. A device, comprising:

one or more processors configured to:

receive historical data identifying historical characteristics, historical location dependent characteristics, and a network service associated with a plurality of consumers;

generate, via a machine learning module of the device, one or more propensity models based on the historical data, wherein at least one of the one or more propensity models is a supervised machine learning model;

receive data identifying characteristics, location dependent characteristics, and the network service associated with target consumers;

process the data, with the one or more propensity models generated via the machine learning module of the device, to determine propensities of the target consumers to utilize the network service;

process the data and the propensities, with a state transition model of the device, to calculate probabilities that the target consumers will utilize the network service;

process the probabilities that the target consumers will utilize the network service, with a microsimulation module of the device, to determine utilization states of the target consumers over time;

aggregate the utilization states of the target consumers, with an aggregation module of the device, to determine penetration rates for the network service;

perform one or more actions based on the penetration rates for the network service; and retrain, via the machine learning module of the device, the one or more propensity models based on the penetration rates for the network service.

9. The device of claim 8, wherein the one or more processors are further configured to:

adjust the penetration rates for the network service based on external factors associated with geographic regions identified in geographic information.

10. The device of claim 8, wherein the one or more processors are further configured to:

adjust the penetration rates for the network service based on intervention features associated with geographic regions identified in geographic information.

11. The device of claim 8, wherein the one or more processors, to aggregate the utilization states of the target consumers, with the aggregation module, to determine the penetration rates for the network service, are configured to:

calculate a ratio of a quantity of network service customers to a total number of the target consumers, in each geographic region of the geographic regions, to determine the penetration rates for the network service.

12. The device of claim 8, wherein the one or more processors, to perform the one or more actions based on the penetration rates for the network service, are configured to one or more of:

calculate growth opportunities for the network service based on the penetration rates for the network service; or utilize the penetration rates for the network service with a financial model to determine whether to offer the network service for the target consumers.

13. The device of claim 8, wherein the one or more processors, to perform the one or more actions based on the penetration rates for the network service, are configured to:

prioritize one or more of the target consumers for offering the network service based on the penetration rates.

14. The device of claim 8, wherein the one or more processors, to perform the one or more actions based on the penetration rates for the network service, are configured to:

determine a time period when to offer the network service for the target consumers based on the penetration rates for the network service.

15. The device of claim 8, wherein the one or more processors are further configured to:

store the data in a data structure.

16. A non-transitory computer-readable medium storing a set of instructions, the set of instructions comprising:

one or more instructions that, when executed by one or more processors of a device, cause the device to:

generate, via a machine learning module of the device, one or more propensity models, wherein at least one of the one or more propensity models is a supervised machine learning model;

receive data identifying characteristics, location dependent characteristics, and a network service associated with target consumers;

process the data, with the one or more propensity models generated via the machine learning module of the device, to determine propensities of the target consumers to utilize the network service, wherein each of the one or more propensity models includes one or more of a propensity model for customer acquisition, a propensity model for customer disconnection, a propensity model for revenue, or a propensity model for a plan change;

process the data and the propensities, with a state transition model of the device, to calculate probabilities that the target consumers will utilize the network service;

process the probabilities that the target consumers will utilize the network service, with a microsimulation module of the device, to determine utilization states of the target consumers over time;

aggregate the utilization states of the target consumers, with an aggregation module of the device, to determine penetration rates for the network service;

perform one or more actions based on the penetration rates for the network service; and retrain, via the machine learning module of the device, the one or more propensity models based on the penetration rates for the network service.

17. The non-transitory computer-readable medium of claim 16, wherein the one or more instructions, that cause the device to process the data and the propensities, with the state transition model, to calculate the probabilities that the target consumers will utilize the network service, cause the device to:

process the data and the propensities, with the state transition model, to determine states associated with the target consumers; and calculate the probabilities that the target consumers will utilize the network service based on the states associated with the target consumers.

18. The non-transitory computer-readable medium of claim 16, wherein the one or more instructions further cause the device to:

adjust the penetration rates for the network service based on external factors associated with geographic regions identified in geographic information.

19. The non-transitory computer-readable medium of claim 16, wherein the one or more instructions further cause the device to:

adjust the penetration rates for the network service based on intervention features associated with geographic regions identified in geographic information.

20. The non-transitory computer-readable medium of claim 16, wherein the one or more instructions, that cause the device to aggregate the utilization states of the target consumers, with the aggregation module, to determine the penetration rates for the network service, cause the device to:

calculate a ratio of a quantity of network service customers to a total number of the target consumers, in each geographic region of the geographic regions, to determine the penetration rates for the network service.

* * * * *